US006496501B1

(12) United States Patent
Rochkind et al.

(10) Patent No.: US 6,496,501 B1
(45) Date of Patent: *Dec. 17, 2002

(54) METHOD AND APPARATUS FOR SCREENING COMPUTER-TELEPHONY CALLS

(75) Inventors: Mark Meier Rochkind, Morristown, NJ (US); Karl Andres Siil, Princeton, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/998,844

(22) Filed: Dec. 29, 1997

(51) Int. Cl.⁷ .......................... H04L 12/66; H04M 3/42
(52) U.S. Cl. ........................ 370/354; 370/401; 379/210; 709/202
(58) Field of Search ................... 370/352, 354–356, 370/400, 401; 709/202; 379/220, 265, 266, 210, 212, 114, 96, 67.1, 45, 69, 215; 705/14

(56) References Cited

U.S. PATENT DOCUMENTS

| 4,277,649 A | | 7/1981 | Sheinbein ........................ 179/7 |
|---|---|---|---|
| 5,077,788 A | * | 12/1991 | Cook et al. ..................... 379/45 |
| 5,127,003 A | * | 6/1992 | Doll, Jr. et al. .............. 370/259 |
| 5,533,103 A | * | 7/1996 | Peavey et al. .................. 379/69 |
| 5,533,115 A | * | 7/1996 | Hollenbach et al. ......... 379/220 |
| 5,651,054 A | * | 7/1997 | Dunn et al. ............... 379/88.11 |
| 5,652,789 A | * | 7/1997 | Miner et al. ................. 379/201 |
| 5,724,418 A | * | 3/1998 | Brady ......................... 379/212 |
| 5,781,613 A | * | 7/1998 | Knuth et al. .............. 379/88.21 |
| 5,790,548 A | * | 8/1998 | Sistanizadeh et al. ........ 370/401 |
| 5,805,587 A | * | 9/1998 | Norris et al. ................ 370/352 |
| 5,805,670 A | * | 9/1998 | Pons et al. ..................... 379/45 |
| 5,809,128 A | * | 9/1998 | McMullin .................... 379/215 |
| 5,835,573 A | | 11/1998 | Dee et al. ................. 379/88.26 |
| 5,867,559 A | * | 2/1999 | Jorgensen et al. .......... 379/67.1 |
| 5,923,659 A | * | 7/1999 | Curry et al. ................. 370/401 |
| 5,946,386 A | * | 8/1999 | Rogers et al. ............... 379/265 |
| 5,970,065 A | * | 10/1999 | Miloslavsky ................ 370/352 |
| 5,999,965 A | * | 12/1999 | Kelly .......................... 709/202 |
| 6,069,890 A | * | 5/2000 | White et al. ................. 370/352 |
| 6,078,894 A | * | 6/2000 | Clawson et al. .............. 705/11 |
| 6,304,636 B1 | * | 10/2001 | Goldberg et al. ......... 379/88.14 |

OTHER PUBLICATIONS

WO 97/47118, Tonnby et al., "A telephone doubler arrangement", Dec. 11, 1997.*
Repartee/TeLaNophy, NetWork Week, http://www.networkweek.com/products/telanophy.html., Oct. 2, 1997.
Active Voice Announces New Repartee Release—TeLaNophy is only desktop product to offer integrated messaging and call management—, Database PRESSline, http://www-.pressline.com/fose/005/html/text2.htm, Oct. 2, 1997.
Viewcall from Repartee, Viewcall, http://www.bcs-net.com/viewcall.htm, Oct. 2, 1997.
TeLaNophy See the Difference, Active Voice–TELANOPHY, http://amdevcomm.com/av_tlan.html, Jun. 18, 1996.
Edwin Margulies, Understanding the Voice–Enabled Internet, Chapter 5, pp. 5–1 to 5–19, First Edition, Aug., 1996.

* cited by examiner

Primary Examiner—Hassan Kizou
Assistant Examiner—John Pezzlo
(74) Attorney, Agent, or Firm—Kenyon & Kenyon (57) ABSTRACT

A computer-telephony call which includes encoded voice communication from a calling party to a called party who has a computer capable of receiving the call, within a communication network having a services platform, can be screened by the called party. The call is received at the services platform, within the communications network, where a communication from the calling party is recorded. The communication of the call is routed to the computer of the called party so that the called party can perceive the communication of the call as the communication is being recorded at the services platform.

17 Claims, 5 Drawing Sheets

METHOD AND APPARATUS FOR SCREENING COMPUTER-TELEPHONY CALLS

FIELD OF THE INVENTION

The present invention relates generally to computer telephony. More specifically, the present invention relates to a network-based method and apparatus for screening telephone calls which involves use of a premises-based computing device.

BACKGROUND

Computer telephony is a form of telecommunications that involves the movement of encoded voice-related and non-voice-related information from one point to another for the purpose of accomplishing transactions between humans, between machines and humans, or between machines. In other words, computer-telephony calls can convey encoded voice-related and non-voice-related information from one computer to another computer, or from a telephone to a computer or vice versa. Computer telephony is generally referred to as a form of telephony where one of the premises endpoints uses a digital computing device (e.g., a personal computer) in place of a conventional telephone headset.

Many of the services currently available with traditional telephony are also applicable with computer telephony. For example, a telephone answering device (TAD) for a traditional telephone located at a called party's location can allow a called party to screen incoming calls. The answering machine can record a voice message being left by a calling party while concurrently playing the voice message out loud. If present during the voice message being recorded, the called party can listen to the voice message and identify the calling party without indicating to the calling party that the called party is present. This concept is referred to herein as "call screening" and is a feature valued by consumers who use TADs. This form of call screening is accomplished with a premises-based TAD and is performed using the voice of the calling party.

Known network-based services exist which deliver call screening information to a called party in the form of the telephone number (and, sometimes, the name) of the calling party at the moment a call is incident (i.e., is ringing) This represents another form of call screening which permits the called party to decide whether or not to answer the inbound call. This form of call screening is performed using the telephone number (and/or name) of the calling party. This service is sometimes referred to as "ANI Display."

Other known network-based telephone answering services exist which will record a message, spoken by a calling party, intended for a called party. Such network-based telephone answering services are generally triggered by line-busy or ring-no-answer conditions at the called party station. Such services are incapable of providing call screening where the called party screens the call based on the voice of the calling party.

Messaging systems can be incorporated with premises-based computers which engage in computer telephony. Known computer-telephony (CT) messaging systems, however, suffer several shortcomings. First, known CT messaging systems cannot operate while the power to the computer is off. A called party present when a CT call is inbound but when the computer power is turned off, will not be aware that a CT call is being received and, consequently, will not be able to screen the call nor learn of the call. The CT call is dropped at the called party's computer and cannot be recovered. The calling party does not have an opportunity to leave a message. Second, if the telephone line used by the premises computing device is otherwise engaged, the computer has no network linkage and so is unaware of any incident call.

Typical CT services maintain a registry of active and available called parties and enable a calling party to discover whether a prospective called party is active and available. Many situations can exist where a called party, particularly one who wishes to screen incoming calls, does not want prospective calling parties to know whether or not the called party is active and available for receiving CT calls. Some CT users will not want to appear in any registry so as not to reveal their existence.

SUMMARY OF THE INVENTION

The present invention allows call screening by the called party of computer-telephony calls through a network-based computer-telephony services platform and a premises-based computing device. The present invention allows computer-telephony call screening when the called party's computer is powered on and has a network presence. When the called party's computer is not available, the network-based services platform simply records the communication of a calling party.

Using a call screening feature, the called party can perceive the calling party's message while the message is being recorded. Furthermore, CT calls can be completed and call screening can be performed without maintaining a registry of active and available called parties. Called parties can maintain their privacy and need not publicly disclose their network presence.

A call having communication from a calling party to a called party, who has a computer capable of receiving the call, within a communications network having a service platform, can be screened. The call is received at the service platform within the communications network. The communication of the call from the calling party is recorded. The communication of the call is routed to the computer of the called party so that the called party can perceive the communication as the communication is being recorded at the service platform.

A request from the called party to connect the call can be received. The call between the called party and the calling party can be connected based on the received request. Recording of the communication of the call at the service platform can be ceased upon receiving the called party's request to connect the call. The partially recorded communication of the calling party can be erased or maintained.

The call can be identified in a variety of manners. First, the call can be identified as a computer-telephony call by the communication-network router associated with the called party. The call can be identified at the communication-network router by a service-type identifier within a header of the call setup packets. The call can be routed from the router to the service platform where the calling party communication can be recorded.

Second, the calling party's service provider and the called party's service provider can coordinate the routing of computer-telephony calls. For example, a database server within the communications network can translate the network address of the called party into the network address of the services platform. The database server can be, for example, the Domain Naming Service (DNS) database server.

Third, the called party can provide a public directory and/or prospective calling parties with a personal DID (direct inward dial) number which terminates at the services platform.

Fourth, a CT call incident directly on the computer of the called party can be immediately redirected to a network-based services platform.

Finally, computer telephony calls can be addressed directly to the services platform where the calling party enters the equivalent of a telephone number or personal identification number (PIN) to identify the called party.

DETAILED DESCRIPTION

Figure 1:
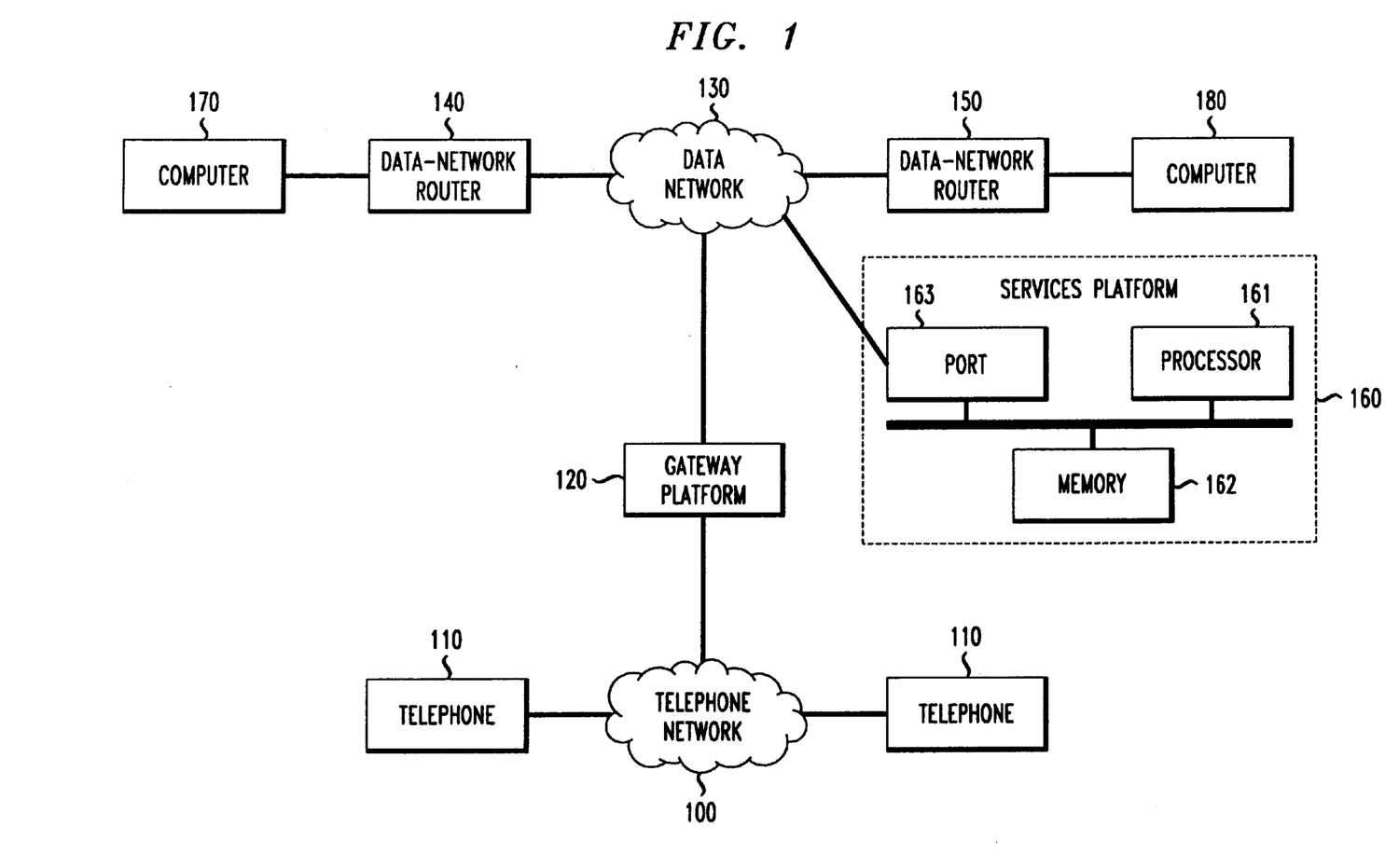
FIG. 1 illustrates elements of a data network connected to elements of a telephone network, according to an embodiment of the present invention.

FIG. 1 illustrates elements of a data network connected to elements of a telephone network, according to an embodiment of the present invention. Telephone network 100 can be connected to multiple telephones 110 and gateway platform 120. Gateway platform 120 is also connected to data network 130. Data network 130 can be connected to computer network routers 140 and 150 and to services platform 160. Computer network router 140 can be connected to computer 170; computer network router 150 can be connected to computer 180.

Telephone network 100 can be of any type including, for example, the public switched telephone network (PSTN), international networks or a combination of networks. For example, telephone network 100 can include the AT&T interexchange (IXC) network and/or central offices of local exchange carriers (LECs).

Data network 130 can be any type of network that carries data including, for example, the Internet, an intranet or any combination of data-bearing networks. Data network 130 can be, for example, a data network using Internet Protocol (IP). The term "data" as used herein is representation of information in a formalized manner suitable for communication, interpretation or processing. This information can include, for example, text, audio, image, video and/or multimedia. Segments of related data being carried within data network 130 are referred to herein as a "data stream." For example, the data being carried within data network 130 and representing the communication of a call between a calling party and a called party is referred to herein as the "data stream" associated with the communication of the call.

Data network routers 140 and 150 can be any type of interconnecting device connecting data network 130 to various computers such as computers 170 and 180. Although FIG. 1 only shows a single computer connected to each data-network router, of course, multiple computers can be connected to each data-network router.

Computers 170 and 180 each can be any digital data processing device such as a personal computer. Computers 170 and 180 transmit and receive data through data-network routers 140 and 150, respectively. The data connections between computers 170 and 180 and network routers 140 and 150, respectively, can be performed by modems over analog facilities and are not shown in FIG. 1 for simplicity.

Gateway platform 120 is any type of electronic repeater device that intercepts and format converts data symbols and/or translates incompatible electrical signals from one network to another. More specifically, gateway platform 120 can be a node on data network 130 that connects data network 130 to the incompatible telephone network 100. Gateway platform 120 performs the necessary processing to convert voice telephone calls from telephone network 100 to a protocol and data format compatible with data network 130, and similarly (CT) calls from data network 130 to telephone network 100.

Services platform 160 can be any type of adjunct platform capable of performing voice messaging services for CT calls. Services platform 160 can comprise processor 161, memory 162 and port 163. Port 163 can be coupled to processor 161 and memory 162. Services platform 160 can be coupled to data network 130 through port 163.

Figure 2A:
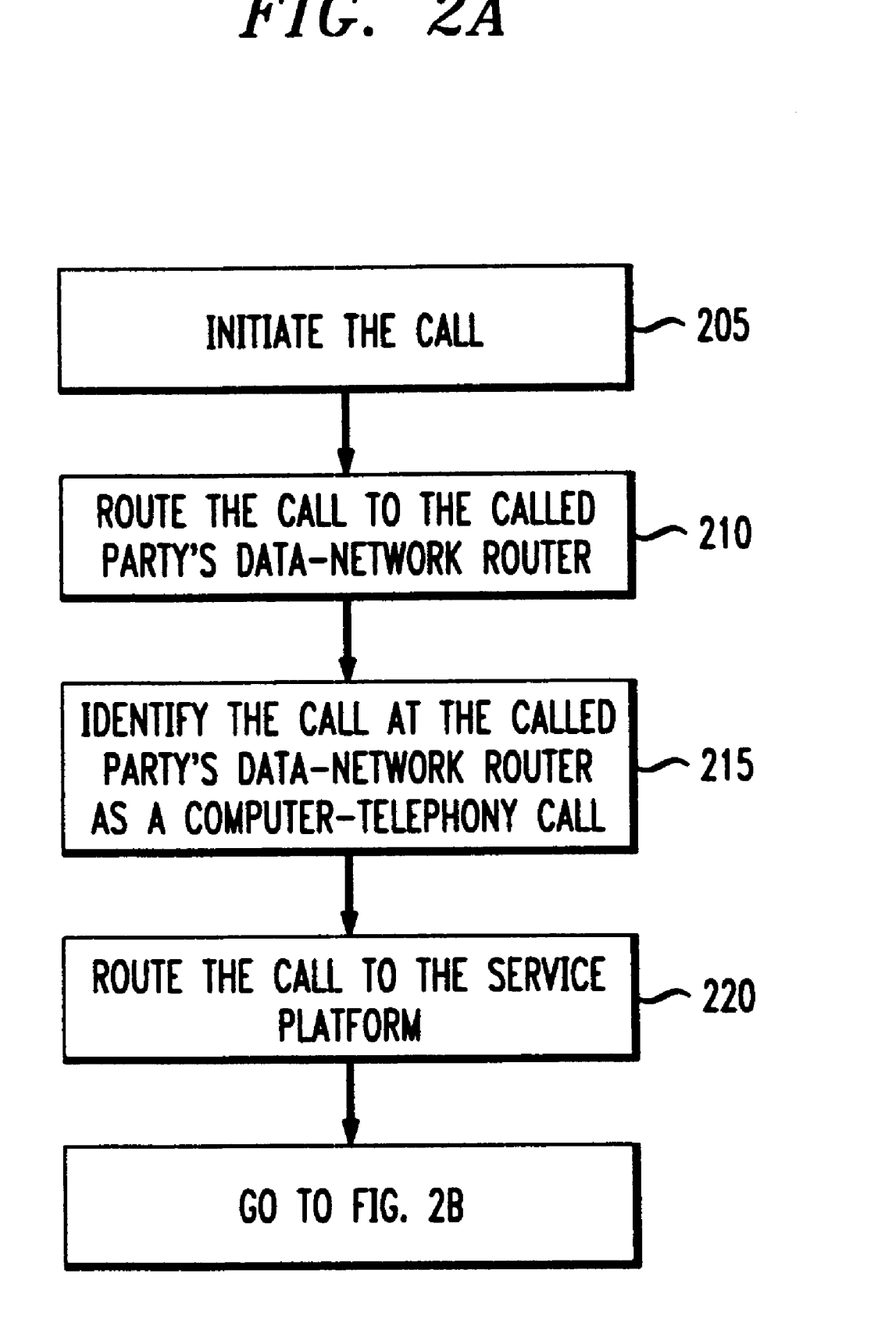
FIGS. 2A and 2B provide a flowchart illustrating a process for screening computer-telephony calls, according to an embodiment of the present invention.
Figure 2B:
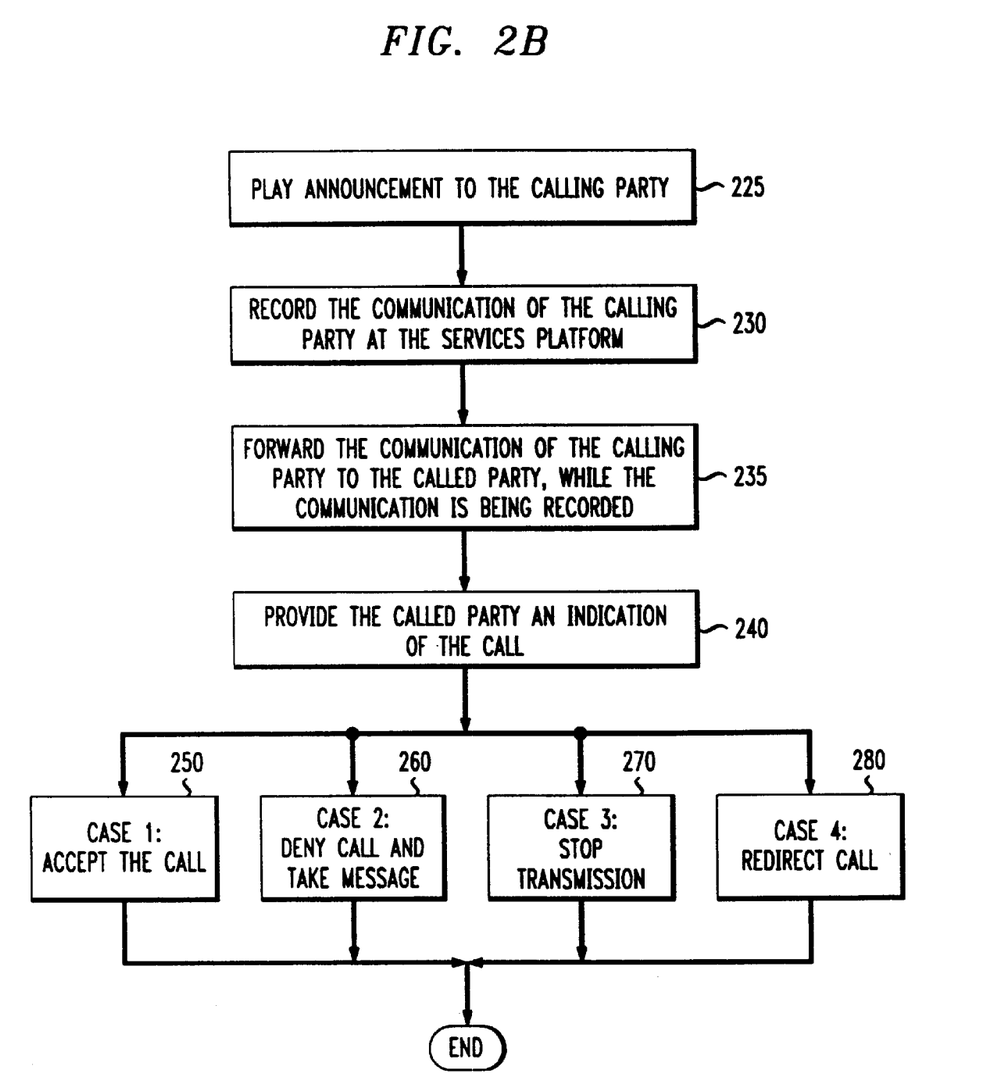

FIGS. 2A and 2B provide a flowchart illustrating a process for screening CT calls, according to an embodiment of the present invention. At step 205, a call is initiated by the calling party; the call can be initiated by the calling party, for example, at telephone 110 or at a computer such as computer 180. For purposes of the following discussion, the called party will be assumed to be located at computer 170 and the calling party will be assumed to be located at computer 180 or telephone 110.

At step 210, the call is routed to the data-network router associated with the called party. More specifically, where the called party is located at computer 170, the corresponding data-network router would be data-network router 140. If the calling party is located at computer 180, then the call would be routed through data-network router 150 and data network 130 to data-network router 140. If the calling party is located at telephone 110, then the call would be routed through telephone network 100, gateway platform 120 and data network 130 to data-network router 140.

At step 215, the call is identified as a CT call at the data-network router associated with the called party. In other words, data-network router 140 would determine that the incident data stream is a CT call carrying voice-based communication from the calling party rather than a purely data-bearing call related to, for example, the transfer of a data file, or the delivery of a facsimile. Of course, CT call can be established and completed solely for the purpose of conveying, for example, facsimile information; these types of CT calls are not further considered.

Data-network router 140 can be configured to distinguish a computer-telephony call application from other applications based on information within certain setup data packets of the call. For example, at the Transport Layer of the Open System Interconnection (OSI) model, a service-type identifier, such as the destination port identifier within the TCP header of the call's packets, can have a recognized value thereby identifying the call as a computer-telephony call.

At step 220, once the call has been identified as a computer-telephony call, the call is routed to services platform 160.

At step 225, an announcement is played to the calling party. The announcement can be, for example, a recording by the called party inviting the calling party to record a message. The announcement can be stored, for example, on memory 162 of services platform 160.

At step 230, the communication of the calling party is recorded at services platform 160. The calling party's recorded communication can be stored, for example, on memory 162 of services platform 160. At step 235, the communication of the calling party being recorded at services platform 160 is forwarded to the called party while the communication is being recorded. The address of the called party is known beforehand by services platform 160 because the called party is a service subscriber and the relevant information has been forwarded previously to services platform 160. The communication can be recorded at services platform 160 and forwarded to the called party simultaneously. If the computer of the called party is disengaged from the data network 130, a simultaneous transmission is not possible and the message would need to be retrieved later.

At step 240, the called party is provided with an indication that an incoming call is being recorded at the services platform. In other words, the called party at, for example, computer 170, receives an indication that a calling party is trying to place a CT call to the called party and that a message is being recorded at services platform 160. Specialized software can be located at computer 170, so that the indication provided by services platform 160 can be interpreted at computer 170 as an indication that a call is being recorded at services platform 160.

The specialized software can provide an indication to the called party in a number of ways. For example, an icon or pop-up window can be displayed on the computer monitor of the called party's computer. Alternatively, the computer can provide an audio tone, such as a beep, indicating that a call is being recorded at services platform 160.

At steps 250 through 280, the called party indicates how the call being recorded at services platform 160 is to be handled. At step 250, where the called party indicates that it wishes to accept the call, the called party at computer 170 is connected to the calling party, for example, located at computer 180 or telephone 110 through the appropriate network connections. The communication of the call being recorded at services platform 160 ceases to be recorded and the process ends.

At step 260, where the called party indicates that it does not wish to receive the call at this time (i.e., denies the call), then the communication of the calling party continues to be recorded at services platform 160 for later replay and the process ends. In this case, the called party can allow the data stream associated with the communication of the calling party to continue to be received so that the called party can continue to listen to the communication being recorded.

At step 270, where the called party indicates that it wishes to stop transmission of the data stream associated with the communication of the calling party, services platform 160 ceases to forward the data stream to the called party and continues to record the communication for later replay. This case can be selected, for example, when the computing device of the called party is so busy with other applications that it is too busy to accept a data stream for call screening.

At step 280, where the called party indicates that it wishes to redirect the call, the call is redirected to an address (or telephone number) provided to services platform 160 by the called party or to a default address stored in services platform 160. In this case, services platform 160 informs the calling party that the call is being redirected, ceases recording the communication unless the calling party wishes to end the call with the recorded message, and performs the redirection unless preempted by the calling party.

Figure 3:
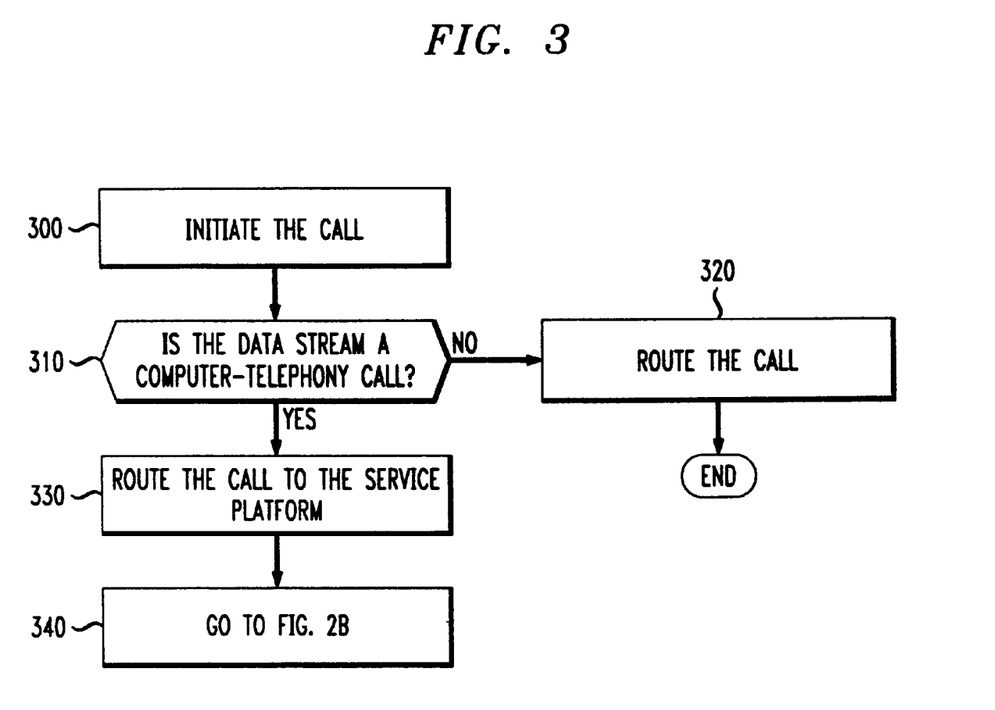
FIG. 3 provides a flowchart by which a computer-telephony call can be identified and routed to the services platform, according to another embodiment of the present invention.

The process described in connection with FIGS. 2A and 2B is just one of several processes by which a CT call can be identified and properly routed to the services platform. FIG. 3 provides a flowchart by which a CT call can be identified and routed to the services platform, according to another embodiment of the present invention.

At step 300, the call is initiated by the calling party. At conditional step 310, the call is evaluated by a database server (not shown) within data network 130, for example at the edge of data network 130, to determine whether the call is a CT call. For a CT call originated with a telephone 110 and conveyed through telephone network 100, this is facilitated by gateway platform 120. For a CT call originated with computer 180, this is initiated by computer 180 and is conveyed by data-network router 150 to the database server within data network 130.

In the case of a CT call, the database server can translate the alphanumeric name of the called party's computer 170 into the numeric network address of services platform 160. This translation can be performed, for example in the case of a call originating from a computer, through a special field within the Domain Naming Service (DNS) database. The DNS database is used on the Internet for translating alphanumeric Domain names of computers into numeric network addresses. The DNS database can associate different numeric network addresses for a single alphanumeric computer name depending upon the application. There has been public discussion about adding address translation functionality for CT calls to the DNS database server; by adding such functionality, the DNS database can be used for addressing and redirecting CT calls.

When the CT call arrives at services platform 160, an exchange can be initiated between services platform 160 and the calling party's computer 180 which identifies the called party. A similar exchange could occur between services platform 160 and gateway platform 120 for a CT call originated by telephone 110.

At conditional step 310, if the data stream is not a computer-telephony call, then the process proceeds to step 320. At step 320, the data stream is normally routed, for example as normal TCP/IP data, and then the process ends. At conditional step 310, if the data stream inbound to the database server is a CT call, then the process proceeds to step 330.

At step 330, the data stream associated with the communication of the calling party is routed to the services platform 160. At step 340, the process proceeds to that described in FIG. 2B, where services platform 160 plays the announcement to the calling party, records a communication of the calling party and forwards the communication to the called party to allow the called party to screen the call.

In another embodiment, the telephone call or data stream is directed to an alphanumeric computer name, a network address or telephone number specifically designated by the called party to prospective CT calling parties. Such a telephone number, referred to herein as a direct inward dial (DID) number, terminates on services platform 160 and is associated with and so identifies the called party. The called party can publish the specifically designed alphanumeric computer name, network address, or telephone number in a public directory or can provide it directly to any prospective calling parties. A calling party can use this specifically designated alphanumeric computer name, network address, or telephone number to route a CT call to a destination that deals exclusively with CT calls, such as services platform 160.

This embodiment advantageously avoids any coordination among service providers and agreements related to intermediary servers, such as the DNS database server. Additionally, this embodiment advantageously does not require a special configuration router associated with the called party to identify the call as a CT call.

Of course other embodiments are possible where the called party computer receives the CT call and then redirects the CT call to another location, such as services platform 160. Such embodiments require the called party computer to be powered on and available to receive and then redirect the incident data stream associated with the CT call.

Figure 4:
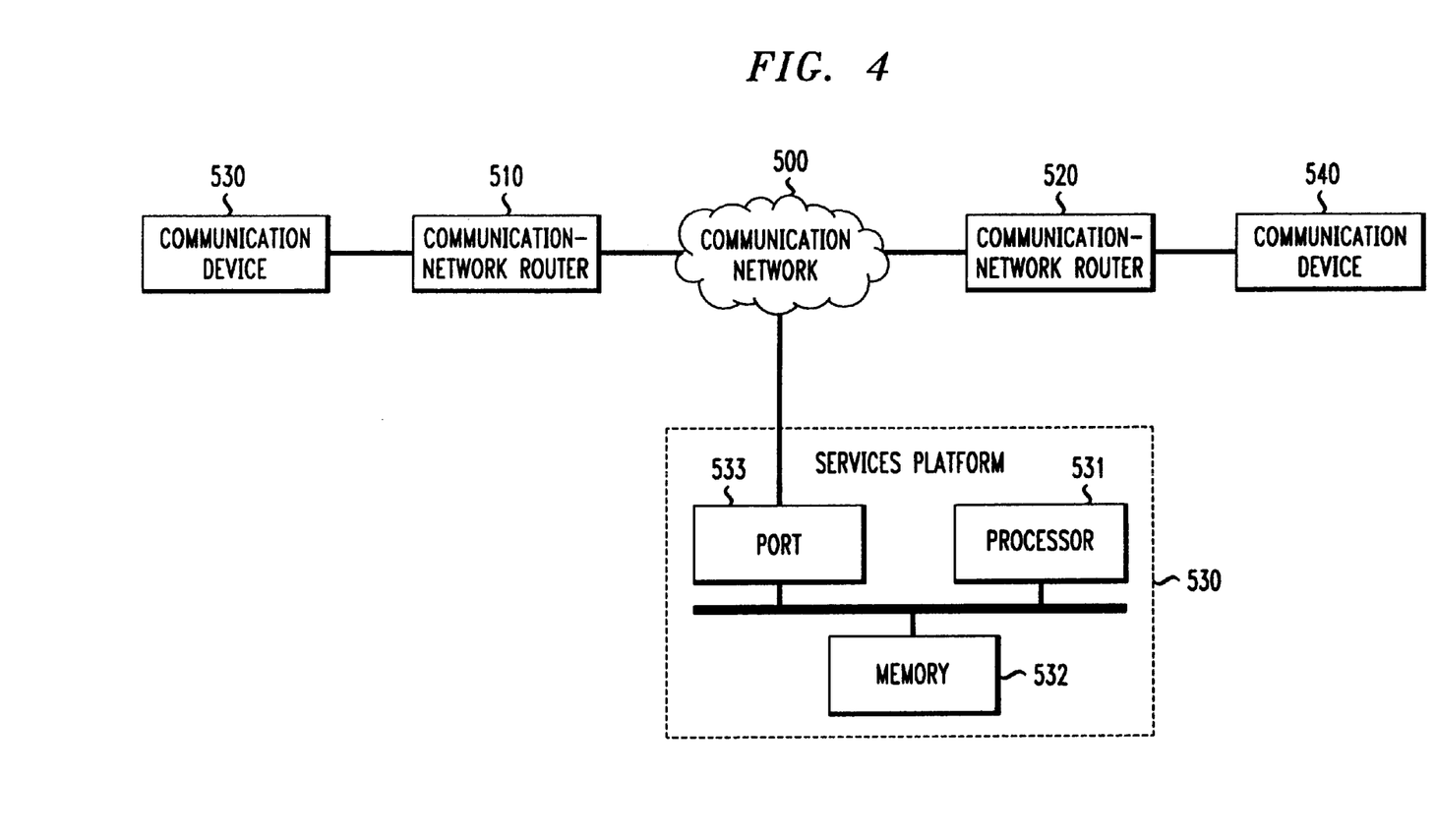
FIG. 4 illustrates a services platform connected to a communication network, according to an embodiment of the present invention.

FIG. 4 illustrates a services platform connected to a communications network, according to an embodiment of the present invention. Communications network 500 can be connected to communication-network routers 510 and 520 and connected to services platform 530. Communication-network router 510 is connected to communication device 550. Communication-network router 520 is connected to communication device 540.

Communications network 500 can be of any type including, for example, a packet switched, circuit switched, connectionless or connection-oriented network or interconnected networks or any combination thereof. Communications network 500 can include, for example, the public switched telephone network (PSTN), the Internet, international networks, or combination of networks. Communications network 500 can also include the AT&T interexchange (IXC) network and/or central offices of local exchange carriers (LECs). Communication devices 540 and 550 can be any of general data processing devices such as a personal computer. The communication device where the calling party is located can also include a traditional telephone. Communication devices 540 and 550 transmit and receive information through communication network routers 520 and 510, respectively. The term "information" as used herein is intended to include data text, audio, image, video and/or multimedia.

FIG. 4 is intended to show a possible embodiment of the present invention where the traditional telephone networks, such as the PSTN, converges with,data networks, such as the Internet. As FIG. 4 illustrates, communication network 500 represents any number of combinations of voice-information networks and data network in any number of arrangements.

It should, of course, be understood that while the present invention has been described in reference to particular system configurations and processes, other system configurations and processes should be apparent to those of ordinary skill in the art. For example, the present invention can include any number of computers, telephones, data-network routers, service platforms, gateway platforms and combination of networks.

What is claimed is:

1. A method for screening a computer telephony call having audible communication from a calling party to a called party, the called party having a computer capable of receiving the call, comprising:

(a) receiving a data stream comprising the computer telephony call from the calling party at a voice messaging service platform within a data-network;

(b) recording the audible communication of the computer telephony call at the voice messaging service platform; and (c) transmitting, prior to connecting the call between the called party and the calling party, the audible communication of the computer telephony call from the voice messaging service platform to the computer of the called party so that the called party can listen to the audible communication of the call substantially simultaneously to the recording of the communication of the call at the voice messaging service platform.

2. The method of claim 1, further comprising:

(d) receiving a request from the called party to connect the call; and (e) connecting the call between the called party and the calling party.

3. The method of claim 1, further comprising:

(d) receiving a request from the called party to connect the call;

(e) connecting the call between the called party and the calling party; and (f) ceasing to record the communication of the call recorded in said recording step (b).

4. The method of claim 1, further comprising:

(d) receiving a request from the called party to redirect the call; and (e) redirecting the call from the calling party to a destination determined by the called party.

5. The method of claim 1, further comprising:

(d) receiving a request from the called party to redirect the call;

(e) redirecting the call from the calling party to a destination previously specified by the called party; and (f) ceasing to record the communication of the call recorded in said recording step (b).

6. The method of claim 1, wherein the data stream is:

received at a data-network router within the data-network, the data-network router coupling the called party to the data-network; and (e) routed from the data-network router to the voice messaging service platform.

7. The method of claim 1, wherein the data stream is:

received at a data-network router within the data-network, the data-network router coupling the called party to the data-network;

identified as a computer telephony call carrying voice-based communication at the data-network router; and routed from the data-network router to the voice messaging service platform.

8. The method of claim 7, wherein the data stream is identified by a service-type identifier within at least one setup data packet associated with the computer telephone call.

9. The method of claim 1, wherein said receiving step (a) is performed through coordination of the calling party's service provider and the called party's service provider.

10. The method of claim 1, wherein the call received in said receiving step (a) was routed to the services platform using information obtained from a database server that translates a network address of the called party into a network address of the services platform.

11. The method of claim 10, wherein the database server is a Domain Naming Service (DNS) database server.

12. The method of claim 1, wherein the call received in said receiving step (a) originates from the calling party based on an alphanumeric computer name previously provided by the called party.

13. The method of claim 1, wherein the call received in said receiving step (a) originates from the calling party based on a network address previously provided by the called party.

14. The method of claim 1, wherein the call received in said receiving step (a) originates from the calling party based on a telephone number previously provided by the called party.

15. The method of claim 1, further comprising:
   (d) providing the calling party an alphanumeric computer name associated with the services platform;

the call received in said receiving step (a) originating from the calling party using the alphanumeric computer name provided in said providing step (d).

16. The method of claim 1, further comprising:
   (d) providing the calling party a network address associated with the services platform;

the call received in said receiving step (a) originating from the calling party using the network address provided in said providing step (d).

17. The method of claim 1, further comprising:
   (d) providing the calling party a telephone number associated with the services platform;

the call received in said receiving step (a) originating from the calling party using the telephone number provided in said providing step (d).

* * * * *